United States Patent [19]
Niki

[11] Patent Number: 5,812,933
[45] Date of Patent: Sep. 22, 1998

[54] DUPLEX RF REPEATER FOR PERSONAL COMMUNICATIONS SYSTEM

[75] Inventor: Yoshiro Niki, Nagoya, Japan

[73] Assignee: Radio Communication Systems Ltd., Hyogo, Japan

[21] Appl. No.: 546,842

[22] Filed: Oct. 23, 1995

Related U.S. Application Data

[63] Continuation of Ser. No. 175,594, Dec. 30, 1993, abandoned.

[30] Foreign Application Priority Data

| Dec. 30, 1992 | [JP] | Japan | 4-362040 |
| May 3, 1993 | [JP] | Japan | 5-138867 |
| Jun. 7, 1993 | [JP] | Japan | 5-173555 |
| Aug. 23, 1993 | [JP] | Japan | 5-241927 |
| Oct. 4, 1993 | [JP] | Japan | 5-280011 |

[51] Int. Cl.$^6$ ................................................. H04B 7/155
[52] U.S. Cl. ............................. 455/16; 455/19; 370/279; 370/315
[58] Field of Search ................................ 455/15, 16, 17, 455/19, 20, 14; 370/26, 29, 75, 97, 279, 294, 315, 319, 321, 327; 343/895

[56] References Cited

U.S. PATENT DOCUMENTS

| 3,480,961 | 11/1969 | Copeland et al. | 343/765 |
| 3,729,740 | 4/1973 | Nakahara et al. | 343/713 |
| 4,154,978 | 5/1979 | Tu | 370/26 |
| 4,335,385 | 6/1982 | Hall | 343/700 MS |
| 4,400,703 | 8/1983 | Shiokawa et al. | 343/895 |
| 4,509,199 | 4/1985 | Ichihara | 370/97 |
| 4,577,327 | 3/1986 | Nambu | 455/15 |
| 4,704,733 | 11/1987 | Kawano | 455/16 |
| 4,754,495 | 6/1988 | Kawano et al. | 455/17 |
| 4,849,963 | 7/1989 | Kawano et al. | 455/15 |
| 5,010,583 | 4/1991 | Parken | 455/15 |
| 5,095,528 | 3/1992 | Leslie et al. | 455/15 |
| 5,115,514 | 5/1992 | Leslie | 455/10 |
| 5,187,806 | 2/1993 | Johnson et al. | 455/15 |
| 5,200,955 | 4/1993 | McFarlane et al. | 370/97 |
| 5,227,742 | 7/1993 | Suzuki | 333/1 |
| 5,321,736 | 6/1994 | Beasley | 455/15 |
| 5,377,255 | 12/1994 | Beasley | 455/17 |
| 5,519,691 | 5/1996 | Darcie et al. | 370/69.1 |

FOREIGN PATENT DOCUMENTS

| 0 605 182 A2 | 7/1992 | European Pat. Off. |
| 37 35 839 A1 | 5/1989 | Germany . |
| 0099804 | 6/1982 | Japan | 343/700 MS |
| 0188106 | 11/1982 | Japan | 343/700 MS |
| 4113727 | 5/1992 | Japan . |

OTHER PUBLICATIONS

Search Report (dated Sep. 9,1994) prepared by European Patent Office against European counterpart.

"Antenna Engineering Handbook", p. 109, Ohm Corporation.

S. Rampalli, et al., "Recent Advances in the Designs of Radiating (Leaky) Coaxial Cables", International Wire & Cable Symposium Proceedings, pp. 66–77 (1991).

(List continued on next page.)

*Primary Examiner*—Edward F. Urban
*Attorney, Agent, or Firm*—Marshall, O'Toole, Gerstein, Murray & Borun

[57] ABSTRACT

A duplex RF repeater for use in a personal communications system distributes and enhances time division duplexed signals at a single RF carrier. The duplex RF repeater includes an up-link amplifier and a down-link amplifier which amplify the time division duplexed signals at the single RF carrier. The repeater also includes a down-stream antenna, which links the repeater with a subscriber, and a controller which decreases the gain of one of the up-link or the down-link amplifiers when an RF signal is present at the other of the up-link or the down-link amplifiers to prevent self-oscillation caused by over coupling between the two amplifiers.

13 Claims, 6 Drawing Sheets

OTHER PUBLICATIONS

B. Cook, "Novel Applications of Radiating Feeder", Motorola, Inc. Technical Developments, vol. 17, Dec. 1992, pp. 142–144.

Wissenschaftliche Berichte Aeg telefunken, vol. 51, No. 2/3, Oct. 1978, Berlin De, pp. 167–175, Eine Streifenleitungs–Richtantenne für den Frequenzbereich 2 bis 40 GHz.

1983 International Symposium Digest Antennas and Propagation, vol. 1, May 1983, Houston, Texas, pp. 162–165, S. Nishimura, "Crank–Type Circularly Polarized Microstrip Linc Antenna".

Proceedings of the National Communications Forum, vol. 43, No. 2, Oct. 1989, Oak Brook, IL., pp. 892–900, T. Burke, "Cellular Coverage In Buildings/Tunnels".

IEEE Transactions on Vehicular Technology, vol. VT–29, No. 3, Aug. 1980, NY, pp. 305–316, T. Suzuki, et al., "Design of a Tunnel Relay System with a Leaky Coaxial Cable in an 800–MHz Band Land Mobile Telephone System".

Oades, John W., "The Linear RF Repeater", *ICC '80 Conference Record*, vol. 1 of 3, pp. 6.2.1–6.2.5, Jun. 8–11, 1980.

DUPLEX RF REPEATER FOR PERSONAL COMMUNICATIONS SYSTEM

This is a continuation of U.S. application Ser. No. 08/175,594, filed Dec. 30, 1993, now abandoned.

BACKGROUND OF THE INVENTION

The invention relates to mobile wireless communication systems and generally to the field of amplifying facilities for RF (Radio-Frequency) signals which are transmitted/ received to/from one or more FDMA (Frequency-Division Multiple Access) or TDMA/TDD (Time-Division Multiple Access/Time-Division Duplex) or CDMA (Code-Division Multiple Access) base stations, and more specifically relates to the facilities to amplify the combined FDMA/TDD or TDMA/TDD or CDMA RF carriers on which RF signals are modulated for enhancing the serving area of a PHP (Personal Handy Phone) system or PCS (Personal Communication Service) system which serving area is sometimes limited by obstructions such as walls and/or ceilings that block RF signals, and to distribute the RF signals for ensuring an extremely higher efficiency of channel usage. When duplex or two-way RF repeaters are used to combine one or more FDMA/TDD or TDMA/TDD or CDMA RF carriers and to distribute them within a plurality of micro-cell serving area, the traffic capacity (consequently the efficiency of channel usage) of the RF carriers is greatly improved, compared to when these FDMA/TDD or TDMA/TDD or CDMA RF carriers are not combined and operated as an independent micro-cell serving area.

PHP systems (i.e., PCS system or PCN, Personal Communications Network) have recently been introduced in a number of outdoor and/or indoor areas to provide wireless public telephone coverages for people who need to have access to public telephones from either inside or outside of their offices or where it is otherwise inconvenient to use public telephones that are hard-wired to a PBX and/or a central switching office over conventional public telephone lines.

In a PHP system or a PCS system, an area is divided into a plurality of small regions, or "micro-cells", each of which is covered by very low power (10 mW) transmitters. Currently, PHP system or PCS services are being provided on the 1.9 GHz frequency bands and operated either in the FDMA/TDD or TDMA/TDD or CDMA schemes wherein one transmitter and receiver set shares one single RF carrier by dividing the time domain into two divisions. One of the divisions is used for "down-link" transmissions from a base station to the subscribers. The "micro-cell site" is the location of the antenna from which the transmissions are propagated for the micro-cell. Another time division is used for "up-link" transmissions from the subscribers within the micro-cell for reception by the base station receiver. Currently, a stand-alone base station is provided centrally within the micro-cell site. Each RF carrier assigned for the PHP system has a 300 kHz bandwidth and for the CT-2 system has a 100 kHz bandwidth.

U.S. Pat. No. 4,849,963, issued Jul. 18, 1989 to M. Kawano, discloses several embodiments of a cell enhancer system, having an amplifier in various configurations for receiving, amplifying, and re-transmitting down-link signals from a cell site into an obstructed area, and also for receiving up-link signals from subscribers in the obstructed area, amplifying them and re-transmitting the amplified signals to the cell site. In one embodiment disclosed in that patent, a single wide-band amplifier has an input terminal that receives both up-link and down-link signals from antennas through a duplexer network, and that transfers through another duplexer network amplified up-link and down-link signals to appropriate antennas transmission. The wide-band amplifier amplifies all signals in at least the two-cellular radio telephone frequency bands.

Problems may arise with the above-described cell enhancer system when applied to PHP systems or to PCS systems. Since the enhancer system amplifies signals in the different frequency bands for up-links and down-links, a duplexer network can separate the RF signals between the up-link and down-link with very large RF isolations and the wide-band amplifier can amplify all signals without an undesired self-oscillation caused by any over-coupling between up-link and down-link amplifiers. However, since the PHP system or the PCS systems adopt either the FDMA/ TDD or TDMA/TDD or CDMA scheme, one single RF carrier is assigned for up-link and down-link transmissions, and since the transmission and reception to/from a base station are divided into two time divisions, it is unable to isolate the up-link and down-link signals with the duplexer networks.

SUMMARY OF THE INVENTION

The present invention provides a new and improved apparatus for amplifying the RF signals to/from a base station to enhance the coverage of the serving area where the obstructions otherwise reduce the RF signal levels, and for distributing one or more FDMA/TDD or TDMA/TDD or CDMA RF carriers into a plurality of the micro-cell serving area to achieve extremely higher channel usage efficiency. The amplifier system must of course have sufficient isolation between up-link and down-link amplifiers to amplify and re-transmit the RF signals assigned for the PHP system or the PCS system so as to avoid undesired self-oscillation caused by any over-coupling between up-link and down-link amplifiers.

In brief summary, the apparatus includes an "upstream" coaxial cable and/or RF radiation cables and/or antenna system directed toward a base station for receiving and transmitting the RF signals to/from the base station, and a "down-stream" coaxial cable and/or antenna system and/or RF radiation cable directed toward subscribers within the micro-cell serving areas. Such coaxial cables and/or antenna systems and/or RF radiation cables (or leaky coaxial cables) are provided to transfer and/or radiate RF signals to/from the subscribers within a micro-cell serving area.

The amplifier system includes at least two mutually isolated amplifiers and optionally a control means for ensuring sufficient isolation between up-link and down-link amplifiers to avoid undesired self-oscillation caused by over-coupling between up-link and down-link amplifiers.

In one embodiment, one common "upstream" coaxial connector to connect a coaxial cable and/or RF radiation cable directing RF signals toward a base station, and one or more "downstream" coaxial connectors to connect one or more coaxial cables and/or antenna systems and/or RF radiation cables are provided to enhance and/or distribute the RF signals into a plurality of the micro-cell serving area. Two isolated up-link and down-link amplifiers amplify the RF signals. When a detector detects the RF signals transmitted from the base station, the control means increases the down-link amplifier gain and decreases the up-link amplifier gain simultaneously to avoid undesired self-oscillation. Alternatively, the control means can monitor the conditions which cause such self-oscillating situations by comparing the outputs from respective detectors and if the conditions exceed prescribed limits, the control means immediately decreases the amplifiers gain.

In a second embodiment, mutually isolated coaxial connectors to connect the coaxial cables and/or antenna systems and/or RF radiation cables directing RF signals toward a base station, and one or more "downstream" coaxial connectors to connect one or more coaxial cables and/or antenna systems and/or RF radiation cables are provided to enhance and/or distribute the RF signals into a plurality of the micro-cell serving area. Two isolated up-link and down-link amplifiers amplify the RF signals. When a detector detects the RF signals transmitted from the base station, the control means increases the down-link amplifier gain and decreases the up-link amplifier gain simultaneously to avoid undesired self-oscillation. Alternatively, the control means can monitor the conditions which cause such self-oscillating situations by comparing the outputs from the respective detectors and if the conditions exceed prescribed limits, the control means immediately decreases the gain of the amplifiers.

In a third embodiment, inputs and/or outputs of a plurality of base stations are combined and distributed toward the duplex RF repeaters, which are installed in a building, underground, on top of poles, and/or on an overhead wire cable, to ensure extremely higher channel usage efficiency.

BRIEF DESCRIPTION OF THE DRAWINGS

The invention is pointed out particularly in the appended claims. The above and further advantages of the invention will be better understood by referring to the following detailed descriptions of an illustrative embodiment taken in conjunction with the accompanying drawings, in which:

DETAILED DESCRIPTION OF AN ILLUSTRATIVE EMBODIMENT

Figure 16:
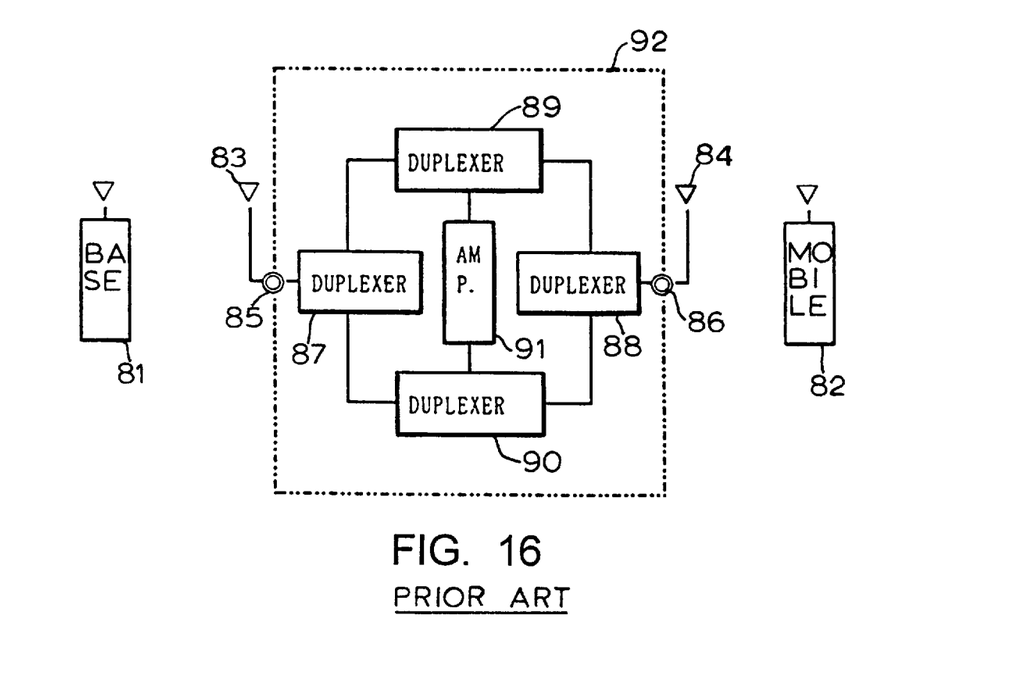
FIG. 16 is a block diagram of a prior cell enhancer system.

With reference to FIG. 16, there is illustrated a prior cell enhancer system 92 as described in the aforementioned U.S. Pat. No. 4,849,963. Cell enhancer system 92 includes an antenna system 83 for the base station 81, a second antenna system 84 for the mobile subscribers 82 in an obstructed region, and an amplifier 91 which receives the RF signals from the base station 81 via the antenna system 83, amplifies them, and transmits them into the shadow region through the antenna system 84. In addition, the cell enhancer 92 receives the RF signals from the mobile subscribers 82 in the shadow region through the antenna system 84, amplifies them and transmits them to the base station 81 through the antenna system 83.

In the cell enhancer 92 depicted in FIG. 16, the amplifier 91 is a single wideband amplifier that is capable of amplifying all frequency carriers in the two 20 MHz radio frequency bands allocated to the cellular service, one band being for down-link transmission from the base station 81 to the mobile subscribers 82 and the other band being for up-link transmission from the mobile subscribers 82 to the base station 81. A duplexer 87 connected to the antenna system 83 through a connector 85 receives the RF signals from the antenna system 83 and transfers the RF signals in the appropriate 870 to 890 MHz band to a second duplexer 89.

Duplexer 89 also has a second input terminal, which receives the RF signals from another duplexer 88, in one of the bands 825 to 845 MHz, from antenna system 84 originating at a mobile subscriber 82. Duplexer 89 couples the RF signals in the selected bands from both duplexers 87 and 88 to an input terminal of a wide-band amplifier 91.

After being amplified by the wideband amplifier 91, RF signals are coupled to the input terminal of another duplexer 90. Duplexer 90 couples the portion of RF signals in the 825 to 845 MHz band to an input terminal of the duplexer 87 which couples RF signals to the antenna system 83 for transmission to the base station 81. The duplexer 90 also couples the portion of RF signal from the wideband amplifier that is in the 870 and 890 MHz band to an input terminal of the duplexer 88, which couples RF signal to the antenna system 84 for transmission into the shadow area.

Figure 1:
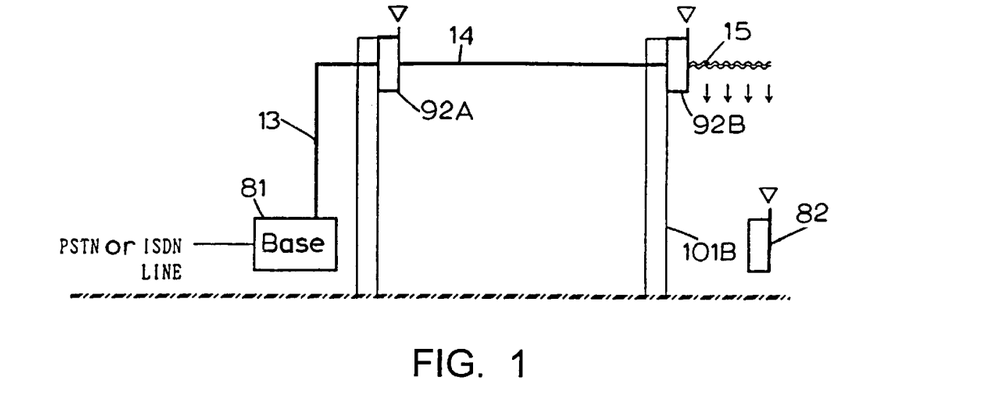
FIG. 1 is an installation scheme of the duplex or two-way RF repeaters in accordance with the invention.

With reference to FIG. 1, two-way RF repeaters 92A and 92B constructed in accordance with this invention are installed on top of respective poles 101A and 101B, and coupled to the base station 81 through suitable coaxial cables 13, 14 and RF radiation cable 15. RF signals transmitted from the base station 81 are sent through the coaxial cables 13, 14 and RF radiation cable 15 (these must be of equal length with respect to the base station to obtain equal time delay) to two-way RF repeaters 92A and 92B, and amplified and radiated through the antenna to the mobile subscribers 82. Since the RF signals from the base station 81 are attenuated by the loss of the coaxial cables 13 and 14, the two-way RF repeaters 92A and 92B must amplify the RF signals up to the required signal level. RF signals transmitted from the mobile subscribers 82 are pre-amplified by the two-way repeaters 92B and 92A, and transferred through the coaxial cable 14 and 13 to the base station 81. The antenna 84 is provided to serve these mobile subscribers within the respective micro-cell serving area. Instead of the antenna systems and/or coaxial cables, RF radiation cables (or leaky coaxial cable) can be used to radiate the RF signals to/from the mobile subscribers.

Figure 2:
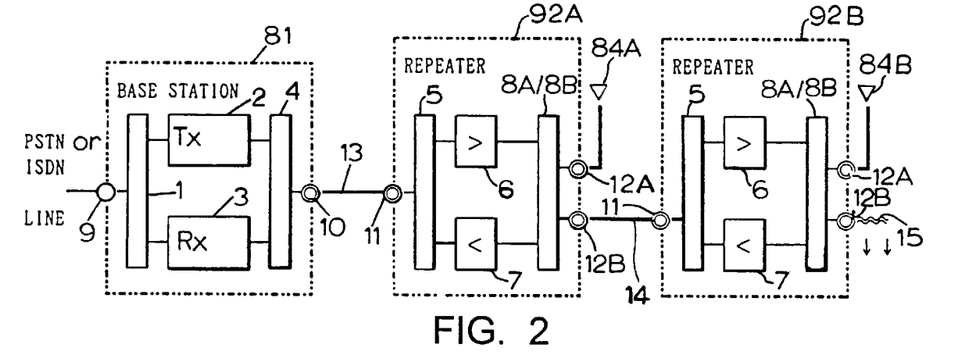
FIG. 2 is a system block diagram including a duplex RF repeater constructed in accordance with the invention.
Figure 3:
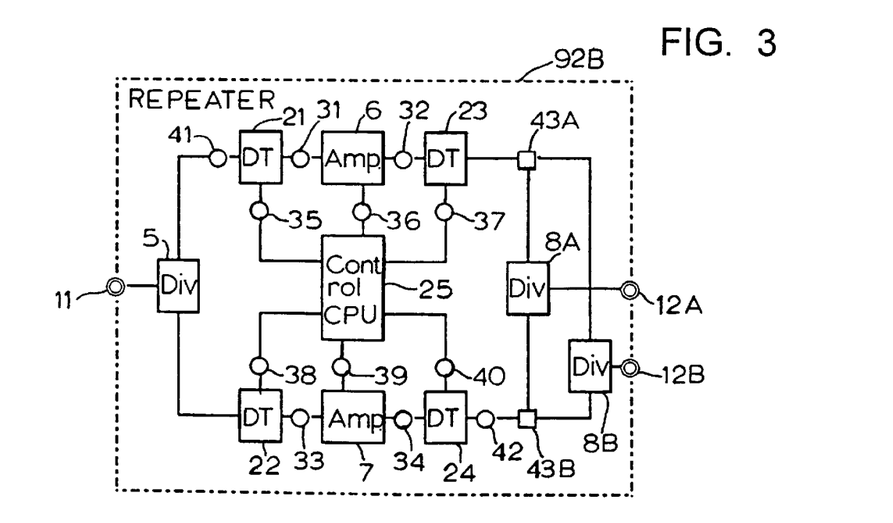
FIG. 3 is a block diagram of a duplex RF repeater constructed in accordance with the invention.

With reference to FIG. 2, two-way RF repeaters 92A and 92B constructed in accordance with this invention are coupled to a base station 81, which consists of one or more FDMA/TDD or TDMA/TDD or CDMA transmitters 2 and receivers 3, a RF combiner/divider 4, and a telephone line combiner 1, through a common coaxial cable 13, 14 and RF radiation cable 15. The two-way RF repeaters 92A and 92B each include, as depicted in FIG. 3, amplifiers 6 and 7, RF signal detectors 21–24, combiners 5 and 8A/8B, dividers 43A and 43B, coaxial connectors 11 and 12A/12B, and a control means 25. Since the transmitters 2 and receivers 3 are operated in accordance with either a FDMA/TDD or TDMA/TDD or CDMA scheme, these are not excited at the same time. When the base station transmits RF signals, the combiner 5 combines the down-link RF signals and couples them to the detector 21. The RF signals are amplified by the amplifier 6 and detected by the detector 23. The detector 21 detects the RF signals from the base station and the output of the detector 21 is connected to the control means 25. The control means 25 controls the linearity of the amplifier 6 comparing the output of the detector 21 with that of the detector 23 and decreases the gain of the amplifier 7 simultaneously. The RF signals amplified and linearized are divided by the divider 43A and one of the outputs is combined by the combiners 8A or 8B and coupled to the coaxial connectors 12A and 12B which are terminated by the "downstream" antenna systems 84A and 84B and RF radiation cable 15. When a subscriber transmits RF signals, the combiner 8A or 8B combines the up-link RF signals and transfers them to a detector 24 through divider 43B. The RF signals are amplified by an amplifier 7 and then detected by a detector 22. If the detector 24 and 22 detect the up-link RF signals, the control means 25 controls the linearity of the amplifier 7, if needed, comparing the output of the detector 22 with that of the detector 24, and decreases the gain of the amplifier 6 simultaneously unless the detector 21 does not detect any RF signals. The said RF signals are combined together by the combiner 5 and are coupled to the coaxial connector 11 which is terminated by the "upstream" coaxial cable and/or antenna system. The control process is continued adaptively and the control parameters are memorized even if the power supply should fail. Some of the detectors may be eliminated if desired. The control means 25 is at least monitoring and supervising the conditions which cause any self-oscillating condition by comparing the outputs from the detectors 21, 22, 23, and 24 and if the conditions exceed the limits, the control means 25 decreases the gain of amplifiers 6 and 7 immediately. If more combiners are provided, then more coaxial cables and/or antenna systems and/or RF radiation cables can be connected to serve the different directions of the serving areas. Furthermore, the combiners and dividers can be provided by a circulator, an electronic switch, a hybrid circuit, a directional coupler, or equivalents thereof.

If a circulator is used instead of the combiner 5, this circulator circulates the down-link RF signals from the terminal 11 to the amplifier 6 and the up-link RF signals from the amplifier 7 to the terminal 11.

If an electronic switch is used instead of the combiner 5, this switches the RF signals as described above.

If a hybrid circuit is used instead of the combiner 5, this divides the RF signals as described above.

If a directional coupler is used instead of the combiner 5, this couples the RF signals as described above.

Figure 4:
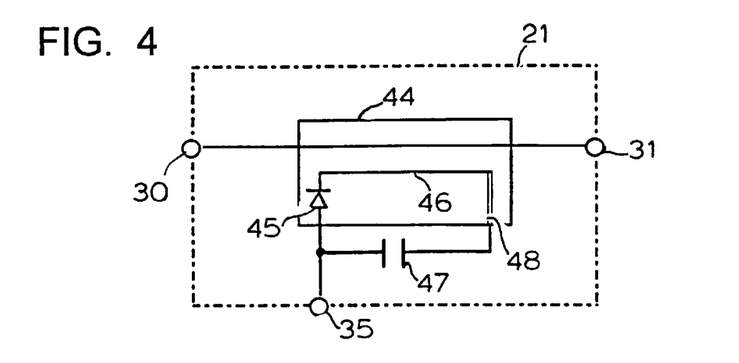
FIG. 4 is a block diagram of a detector constructed in accordance with the invention.

FIG. 4 is a block diagram of the detector 21 which includes a directional coupler 44, a coupling loop 46, a terminated load 48, a detecting diode 45, and a by-pass capacitor 47. When the RF signals are applied from a terminal 30 to a terminal 31, a portion of them is coupled by the loop 46 to the diode 45, by-passed by the capacitor 47, and led to a terminal 35. Another end of the loop 46 is terminated by the load 48. It is to be understood that of the RF signals coupled to the terminal 30, most of the RF signals are transferred to the terminal 31. Some portion of the RF signals from the terminal 30 are coupled to the loop 46 and detected into a DC voltage. This block diagram depicts the case that the detectors detect the envelope or amplitude of the RF signals, but these detectors may instead detect the phase and/or frequency modulated RF signals on one single carrier and output the other signal schemes.

Figure 5:
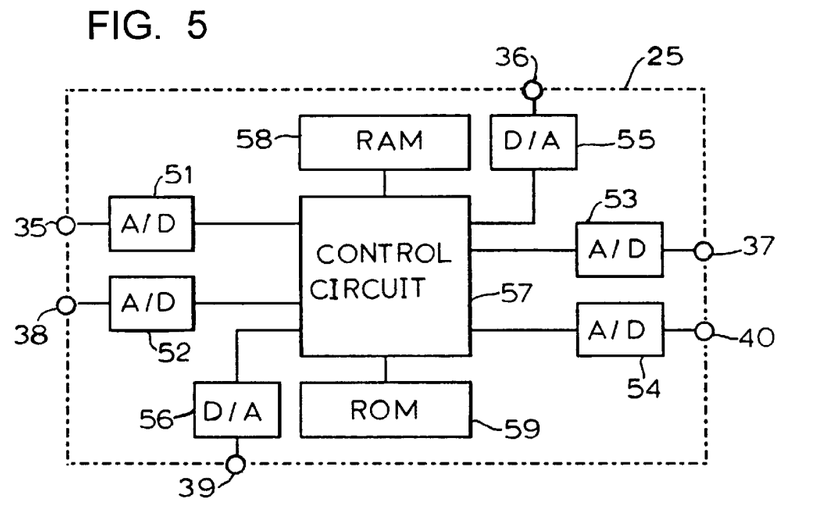
FIG. 5 is a block diagram of a controller constructed in accordance with the invention.

FIG. 5 is a block diagram of the control means 25 which includes A/D converters 51–54, D/A converters 55 and 56, a control circuit 57, a random access memory (RAM) 58, and a read only memory (ROM) 59. When the detector 21 detects the RF signals and outputs the DC voltage and/or other signal schemes to the terminal 35, the output signal is converted from an analog signal to a digital signal by the A/D converter 51. By the same manner, the output signals from detectors 22, 23, and 24 are converted from an analog signal to digital signals by the A/D converters 52–54. The control software is entered in the ROM 59 and according to which the linearity and/or gain of amplifiers 6 and 7 are controlled through the D/A converters 55 and 56. These control parameters are memorized in the RAM 58 even when the power supply fails.

Figure 6:
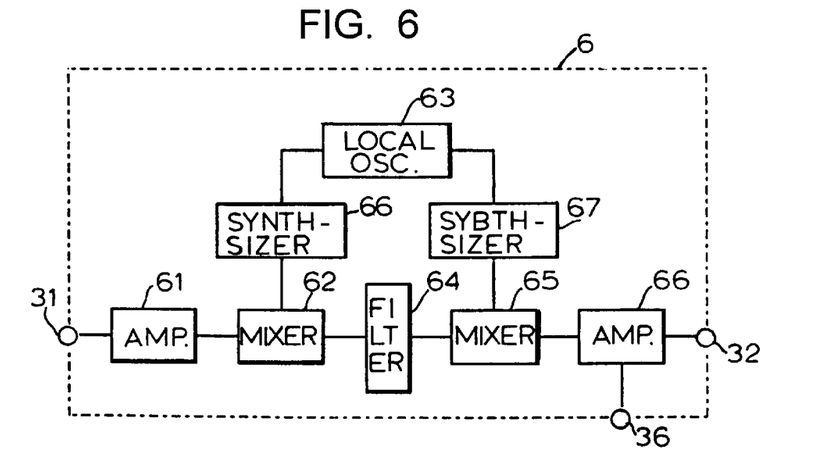
FIG. 6 is a block diagram of another type of amplifier constructed in accordance with the invention.

FIG. 6 is a block diagram of the amplifiers 6 or 7 which are usually constructed with only linear amplifiers 61 and 66. Respective mixers 62 and 65, a local oscillator 63, and a filter 64 also are provided. When RF signals are applied to the terminal 31, these RF signals are amplified by the amplifier 61, converted to an intermediate frequency by the mixer 62 combining the local frequency generated by the local oscillator 63, filtered by the filter 64, converted to an original frequency by the mixer 65 combining the local frequency generated by the oscillator 63, and then amplified and transferred to the terminal 32 by the linear amplifier 66 having a gain which is controlled through the terminal 36.

Figure 7:
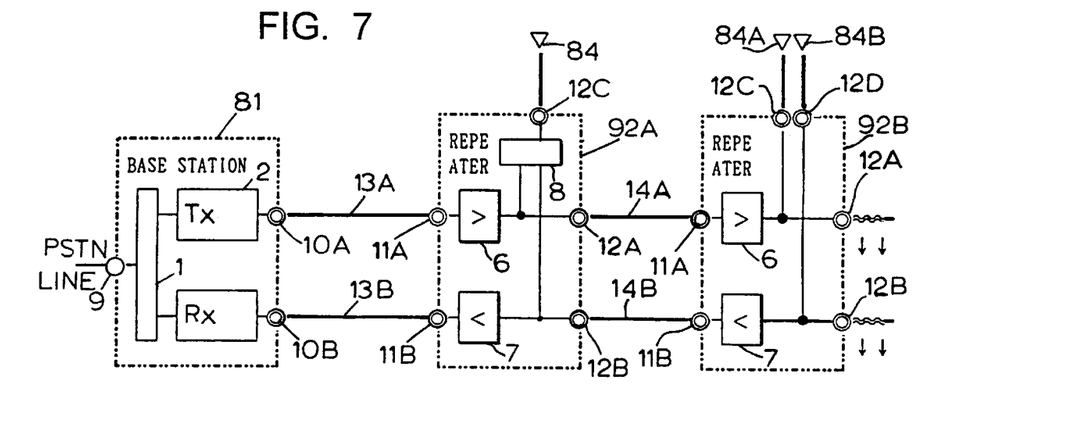
FIG. 7 is a system block diagram including a duplex or two-way RF repeater of a second embodiment of the invention.
Figure 8A:
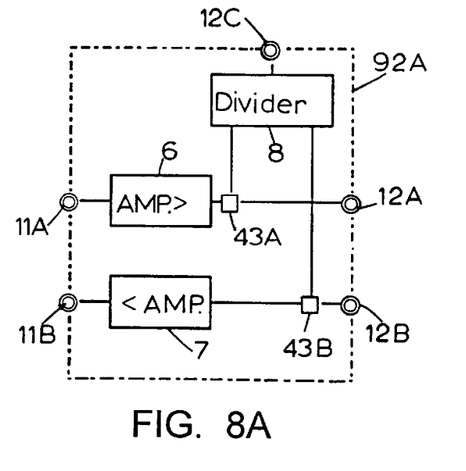
FIG. 8 is a block diagram of a duplex RF repeater of the second embodiment of the invention.
Figure 8B:
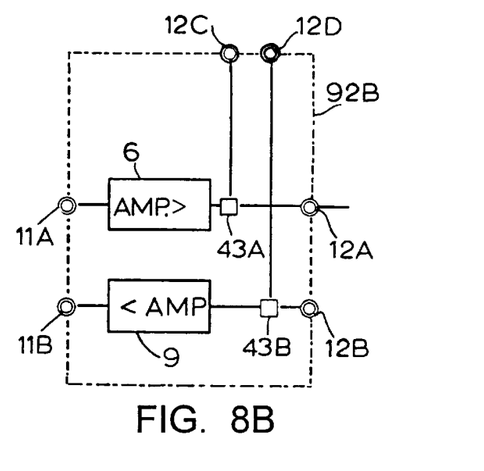

With reference to FIG. 7, duplex RF repeaters 92A and 92B of the second embodiment of the invention are coupled to a base station 81, which consists of one or more FDMA/TDD or TDMA/TDD or CDMA transmitters 2 and receivers 3, and a telephone line combiner 1, through mutually isolated coaxial cables 13A/13B and 14A/14B and 15A/15B. The two-way RF repeater 92A and 92B includes, as depicted in FIG. 8(A) and 8(B), amplifiers 6 and 7, dividers 43A and 43B, a combiner 8 (not in RF repeater 92B), and coaxial connectors 11A, 11B, 12A, 12B and 12C. Note that the two-way RF repeater 92B includes an additional coaxial connector 12D instead of a combiner 8. Since the transmitters 2 and receivers 3 have isolated terminals 10A and 10B and are operated in accordance with either the FDMA/TDD or TDMA/TDD or CDMA schemes, these transmitters and receivers are isolated enough and not excited at the same time. When a base station 81 transmits RF signals, these RF signals are sent through coaxial cable 13A and transferred to the terminal 11A. These RF signals are amplified by the isolated amplifier 6, divided by the divider 43A, combined by the combiner 8, and led to the coaxial connector 12C which is terminated by the "downstream" antenna system 84. Another side of the divider 43A is terminated by the connector 12A. When a mobile subscriber transmits RF signals, the combiner 8 and the divider 43B couple the up-link RF signals to the isolated amplifier 7. After amplification, the RF signals are led to the isolated terminal 11B, connected to the isolated coaxial cable 13B, and then coupled to the receiver 3 in the base station 81. Since all circuits except combiner 8 in the two-way RF repeaters 92A are isolated enough, there are enough margins to avoid an undesired self-oscillation caused by the over-coupling between up-link and down-link amplifiers.

Conditions between these parameters are:

$$2S+2L+T/R>2G$$

Where:
S=Isolation of the combiner 8 in dB
L=Loss of the coaxial cables 14A and 14B in dB
T/R=Loss between Transmitter and Receiver in dB
G=Gain of the amplifiers 6 and 7 in dB Since the gain of the amplifiers is set equal to the loss of coaxial cables (2L=2G), (2S+T/R)dB is a desired prescribed margin to avoid undesired self-oscillations. If more combiners and dividers are provided in the RF repeater, RF signals can be distributed to the multiple directions. Since the two-way RF repeater 92B, as depicted in FIG. 8(B), includes a coaxial connector 12D instead of the combiner 8, two isolated "downstream" antenna system and/or RF radiation cables can be connected to ensure the larger isolations between up-link and down-link amplifiers than that of the combiner 8.

Figure 9:
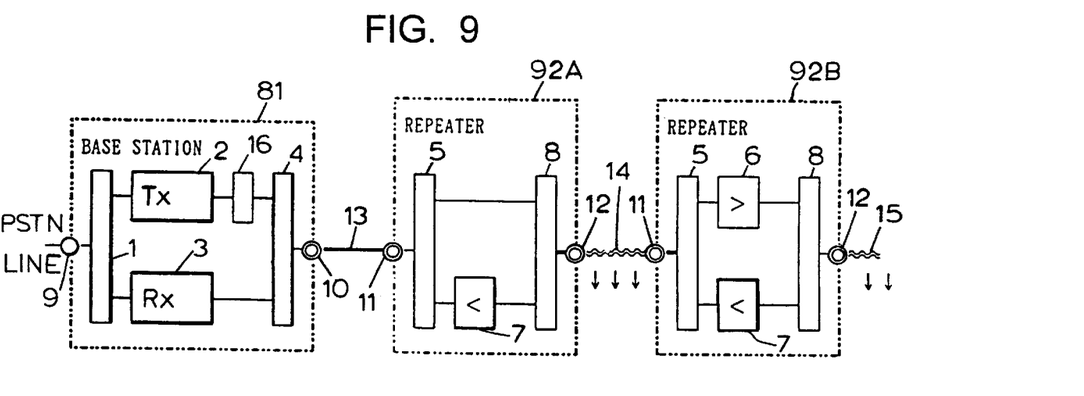
FIG. 9 is a system block diagram including a duplex RF repeater of a third embodiment of the invention.
Figure 10A:
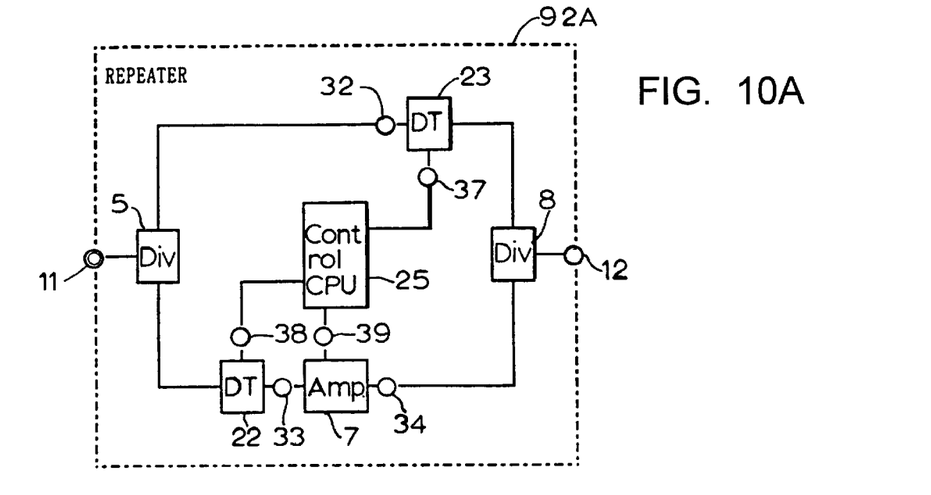
FIGS. 10A and B are block diagrams of a duplex RF repeater of the third embodiment of the invention.
Figure 10B:
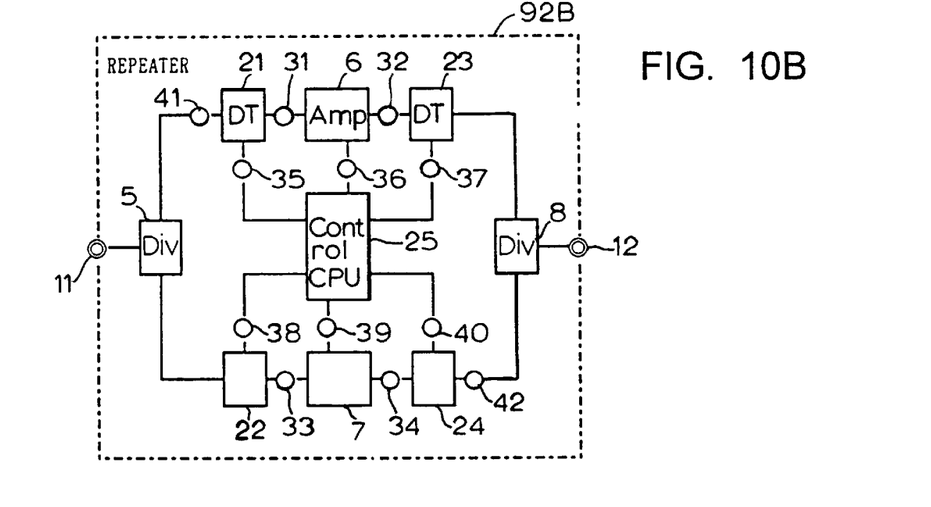

With reference to FIG. 9, duplex RF repeaters 92A and 92B of the third embodiment of the invention are connected toward a base station 81, which consists of one or more FDMA/TDD or TDMA/TDD or CDMA transmitters 2 and power amplifiers 16 and receivers 3, a RF combiner 4, and a telephone line combiner 1, through the common coaxial cables 13 and RF radiation cables 14 and 15. The RF radiation cables 14 and 15 radiate RF signals perpendicularly from the surface of the cables and couple RF signals to the mobile subscribers and ensure radio communications between the base station and the mobile subscribers. The two-way RF repeater 92A includes, as depicted in FIG. 10(A), an amplifier 7, an RF signal detector 23, combiners 5 and 8, coaxial connectors 11 and 12, and a control means 25. Since the transmitter 2 and receiver 3 are operated in accordance with either the FDMA/TDD or TDMA/TDD or CDMA schemes, these are not excited at the same time, but the power output of the transmitters 2 are amplified several times by the high power amplifiers 16. When the base station transmits RF signals, the combiner 5 combines the down-link RF signals and leads them to a detector 23. The RF signals are high enough that they need not be amplified with an amplifier in the RF repeater 92A and/or 92B. If the RF signals are detected by a detector 23, the control means 25 decreases the gain of the amplifier 7 simultaneously. The RF signals are combined by the combiner 8 and are led to the coaxial connector 12 which is terminated by the "downstream" RF radiation cable 14. When a subscriber transmits RF signals, the RF signals are coupled to the RF radiation cable 14 and the combiner 8 combines the up-link RF signals and transfers them to the amplifier 7 so that these RF signals are detected by a detector 22. When the detector 22 detects the RF signals, the control means 25 decreases the gain of the amplifier 7 simultaneously. The amplified RF signals are combined by the combiner 5 and coupled to the coaxial connector 11 which is terminated by the "upstream" coaxial cable 13. The control process is continued adaptively as described above. The two-way RF repeater 92B, as depicted in FIG. 10(B), the detector 21 and amplifier 6 are added to the above-two way RF repeater 92A which amplifies the down-link RF signals which are pre-amplified by a power amplifier 16, since the repeater 92B is located far from the base station 81.

Figure 11:
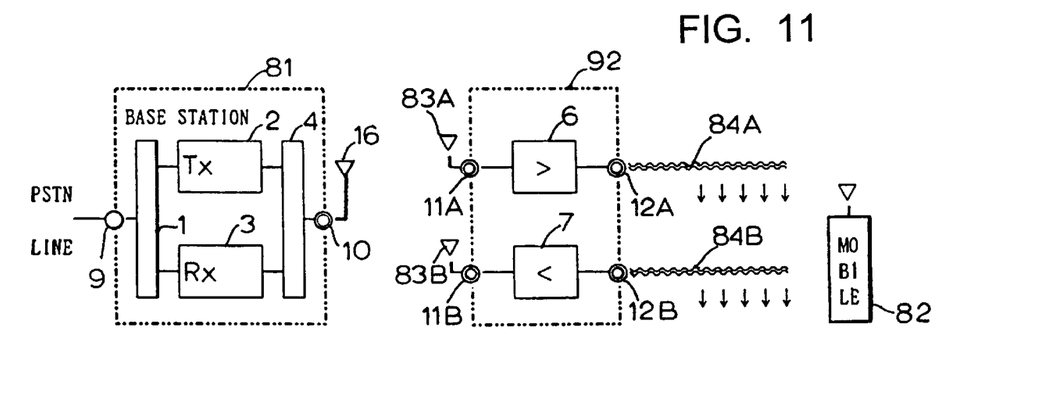
FIG. 11 is a system block diagram including a duplex RF repeater of a fourth embodiment of the invention.
Figure 12:
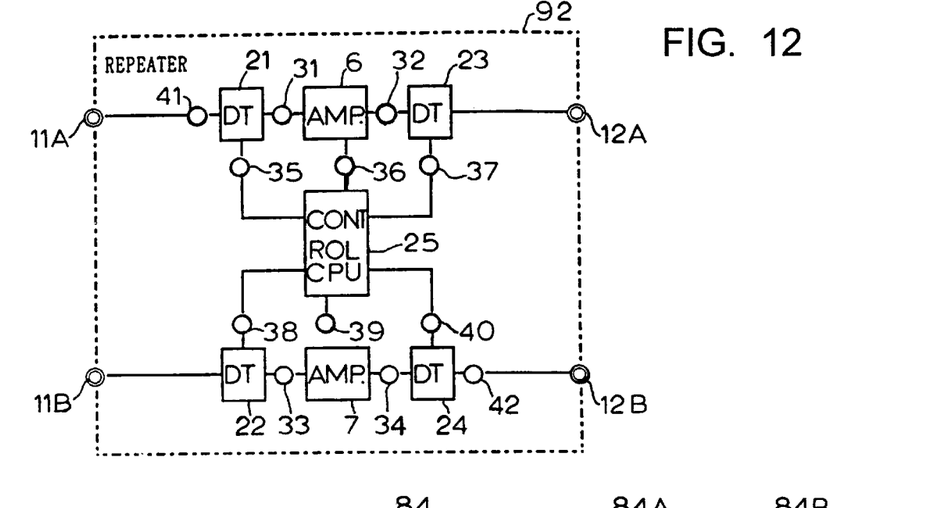
FIG. 12 is a block diagram of a two-way RF repeater of the fourth embodiment of the invention.

With reference to FIG. 11, a duplex RF repeater 92 in a fourth embodiment of the invention is coupled to a base station 81, which consists of one or more FDMA/TDD or TDMA/TDD or CDMA transmitters 2 and receivers 3, a RF combiner 4, a "downstream" antenna system 16, and a telephone line combiner 1, through the "upstream" antenna system 83A and 83B of the two-way RF repeater 92. The duplex RF repeater 91, as depicted in FIG. 12, includes amplifiers 6 and 7, RF signal detectors 21–24, coaxial connectors 11A, 11B, 12A, and 12B, and a control means 25. The "downstream" RF radiation cables and/or antenna systems 84A and 84B are connected to the connector 12A and 12B to couple through RF signals with the mobile subscribers within the micro-cell serving area. Since one or more transmitters 2 and receivers 3 are operated in accordance with either the FDMA/TDD or TDMA/TDD or CDMA schemes, these are not excited at the same time. When the base station transmits RF signals, an antenna 83A receives the RF signals from the base station and they are transferred to a detector 21 which may be installed at the middle stage of the amplifier 6. The RF signals are amplified by an amplifier 6 and detected by a detector 23. If the detector 21 detects high RF signals, the control means 25 controls the linearity of the amplifier 6 after comparing the output of the detector 23 with that of the detector 21, and decreases the gain of the amplifier 7 simultaneously. The RF signals amplified and linearized are led to the coaxial connector 12A which is terminated by the "downstream" RF radiation cables and/or antenna systems 84A, and a mobile subscriber can receive these RF signals accordingly. When a mobile subscriber 82 transmits RF signals, the "downstream" RF radiation cables and/or antenna systems 84B receive the up-link RF signals and transfer them to a detector 24 which may be installed at the middle stage of the amplifier 7. The RF signals are amplified by an amplifier 7 and then detected by a detector 22. If the detectors 24 and 22 detect the up-link RF signals, the control means 25 controls the linearity of the amplifier 7 after comparing the output of the detector 22 with that of the detector 24, and decreases the gain of the amplifier 6 simultaneously if the detector 21 does not detect larger RF signals. The RF signals amplified and linearized by the amplifier 7 are led to the coaxial connector 11B which is terminated by the "upstream" antenna system 83B. These controls are continued adaptively and the control parameters are memorized even when the power supply fails. Some of the detectors may be eliminated if desired.

Figure 13:
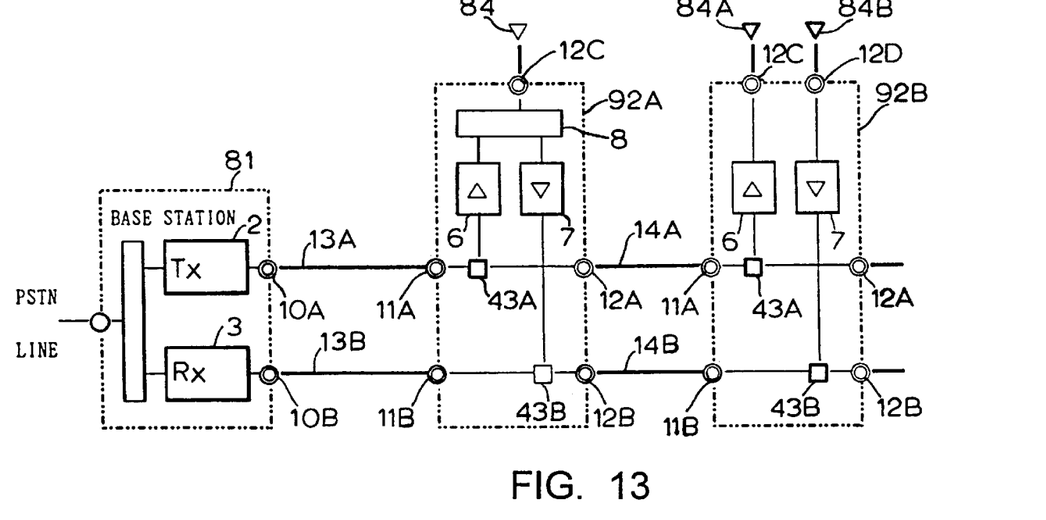
FIG. 13 is a block diagram of a two-way RF repeater of a fifth embodiment of the invention.

With reference to FIG. 13, duplex RF repeaters 92A and 92B of a fifth embodiment of the inventions are coupled to a base station 81, which consists of one or more FDMA/TDD or TDMA/TDD or CDMA transmitters 2 and receivers 3, and a telephone line combiner 1, through isolated coaxial cables 13A and 13B and/or 14A and 14B. The two-way RF repeater 92A and 92B includes two-way amplifiers 6 and 7, a combiner 8, directional couplers 43A and 43B, and coaxial connectors 11A, 11B, 12A and 12B, except that the two-way RF repeater 92B includes a coaxial connector 12D instead of the combiner 8. Since the transmitters 2 and receivers 3 are isolated at the terminals 10A and 10B, and are operated in accordance with either the FDMA/TDD or TDMA/TDD or CDMA scheme, these are isolated enough and not excited at the same time. When the base station transmits RF signals, the signals are transferred through the coaxial cable 13A and reach the terminal 11A. These signals are coupled with a directional coupler 43A and are amplified by the isolated amplifier 6, combined by the combiner 8, and led to the coaxial connector 12C which is terminated by the "downstream" antenna systems and/or RF radiation cables 84A.

When a mobile subscriber 82 transmits RF signals, the combiner 8 combines the up-link RF signals which are led to the isolated amplifier 7. After amplification, the RF signals are led to a directional coupler 43B and then to the isolated terminal 11B. The RF signals are coupled to the isolated coaxial cable 13B, and led to the receivers 3 in the base station 81. Since all of the circuits except combiner 8 in the two-way RF repeaters 92A are isolated enough, there are enough margins to avoid an undesired self-oscillation caused by the over-coupling between up-link and down-link amplifiers. Conditions between parameters are:

$$2S+2C+2L+T/R>2G$$

Where:

S=Isolation of the combiner 8 in dB

C=Loss of the directional coupler in dB

L=Loss of the coaxial cables 14A and 14B in dB

T/R=Loss between Transmitter and Receiver in dB

G=Gain of the amplifiers 6 and 7 in dB

Since the gain of the amplifiers is set equal to the loss of coaxial cables, (2S+2C+T/R) dB is a desired prescribed margin to avoid undesired self-oscillations. This method is applicable for the usage of common coaxial cables as in FIG. 2 or 9 with a common directional coupler. Since the two-way RF repeater 92B includes a coaxial connector 12D instead of the combiner 8, two isolated "downstream" antenna systems and/or RF radiation cables can be connected to ensure the larger isolations between up-link and down-link amplifiers than that of the combiner 8.

Figure 14:
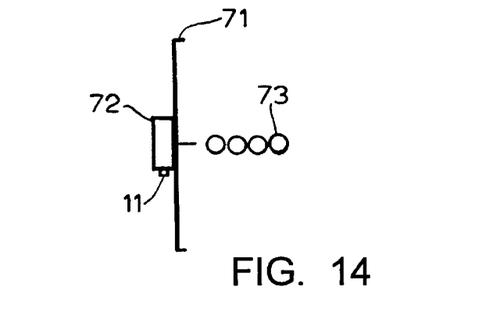
FIG. 14 is an antenna structure constructed in accordance with the invention.

With reference to FIG. 14, an antenna structure which is constructed in accordance with this invention includes a ground plane 71, a shielding box 72, a helical antenna 73, and a coaxial connector 11. Standing waves are often observed under indoor radio propagation conditions and these degrade the quality of the indoor radio communications. If an antenna has a ground plane 71, such standing waves always generate the "zero potential" at the surface of the ground plane 71. Since this type of antenna is designed by considering the fact that the potential of the ground surface is always "zero", a good reception of the RF signals is always being maintained even if standing waves are present. To minimize the connection loss between the "downstream" antenna system and a two-way RF repeater and to keep a compact size, it is essential to put a two-way RF repeater within a shielding box 72. Instead of a helical antenna, other types of ground plane type antennas are applicable, such as a ground plane array antenna, a parabolic antenna, corner reflector antenna, patch antenna, etc.

Figure 15:
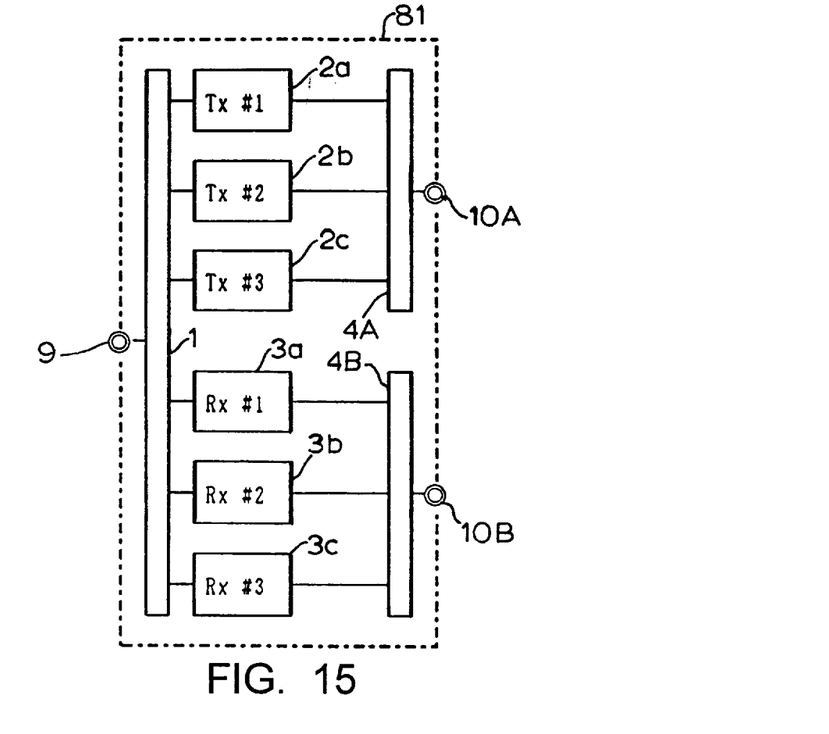
FIG. 15 is a block diagram of a base station constructed in accordance with the invention.

With reference to FIG. 15, a base station which is constructed in accordance with this invention includes telephone line interface circuits 1, two or more FDMA/TDD or TDMA/TDD or CDMA transmitters 2a, 2b and 2c, two or more FDMA/TDD or TDMA/TDD or CDMA receivers 3a, 3b and 3c, a transmitter combiner 4A, a receiver divider 4B, and isolated coaxial connectors 10A and 10B. Comparison table is shown hereunder which describes the number of TDMA/TDD transmitters and receivers vs. traffic capacity, when the TDMA/TDD has 4 time slots, and one control slot per one base station is assigned, and 1% of blocking rate is applied. As shown in the Table, if the transmitter outputs and receiver inputs are combined and/or divided, the traffic capacities are significantly increased according to the increment of the number of transmitters and receivers.

| No. of B/S | Stand alone B/S | Combined & Distributed |
|---|---|---|
| 1 | 0.45 Erlang | 0.45 Erlang |
| 2 | 0.45 × 2 = 0.9 | 2.48 × 1 = 2.48 |
| 3 | 0.45 × 3 = 1.35 | 5.1 × 1 = 5.1 |
| 4 | 0.45 × 4 = 1.8 | 8.0 × 1 = 8.0 |

Another problem area for digital signal transmissions over radio frequencies is the bad Bit Error Rate under delay spread circumstances caused by multi-path propagations. A RF radiation cable (or a leaky coaxial cable) and/or a RF radiation wave guide are very effective to eliminate such problem and to ensure a good Bit Error Rate even under delay spread circumstances. For such purposes coaxial cables and/or antenna systems shown in FIG. 1, 2, 7, 9, 11 and 13 can be replaced by a RF radiation cable (or leaky coaxial cable) or a RF radiation wave guide or similar means.

When the listen-before-talk is required, either a base station or subscriber must monitor the RF signals whether occupied or not. When the transmitters and receivers are operated in accordance with either the FDMA/TDD or TDMA/TDD or CDMA schemes, the receiver in the base station must have the capability to monitor the RF carriers even if the transmitter, which is located close to the receiver, is transmitting the RF signals, and which may densitize the receiver sensitivity. The separated antenna systems and/or RF radiation cables as depicted as the two-way RF repeater 92B in FIG. 7 or FIG. 13 are very effective to resolve these problems.

The foregoing descriptions are limited to a specific embodiment of this invention. It will be apparent, however, that this invention can be practiced in systems having diverse basic constructions or that use different internal circuitry than is described in the specifications with some or all of the appended claims to cover all such variations and modifications which come within the true spirit and scope of this invention.

What is claimed as new and desired to be secured by letters patent is:

1. For use in a mobile wireless communication system, a duplex RF repeater for distributing and enhancing at least one single RF carrier on which both a transmitter and a receiver for a base station are operated in the time division duplex mode, to improve the efficiency of the frequency usage in a serving area and to improve the quality of the communications between the base station and a subscriber unit, said duplex RF repeater comprising:

(a) divider means for enabling said RF carrier to be transmitted from said base station towards said subscriber unit, and to be transmitted from said subscriber unit towards said base station, including first and second divider means, said first divider means for coupling said RF carrier transmitted from the subscriber unit towards the base station;

(b) a first up-link connection means to connect a first RF transmission cable for transmitting said RF carrier directed towards the base station, an up-link amplification means for amplifying said RF carrier, a second up-link connection means to connect an up-link RF transmission cable for receiving said RF carrier transmitted from the subscriber unit, said first divider means coupling said second up-link connection means with a common connection means;

(c) said second divider means for coupling said RF carrier transmitted from the base station towards the subscriber unit;

(d) a first down-link connection means to connect a second RF transmission cable for receiving said RF carrier transmitted from the base station, a down-link amplification means for amplifying said RF carrier, a second down-link connection means to connect a down-link RF transmission cable for transmitting said RF carrier directed towards the subscriber unit, said second divider means coupling said second down-link connection means with said common connection means;

(e) an isolation means having control means for controlling said up-link and down-link amplification means for ensuring sufficient isolation between said up-link connection means and said down-link connection means even on said one single RF carrier to prevent a self-oscillation caused by a coupling between said up-link connection means and said down-link connection means; and (f) said first and second divider means coupling even said one single RF carrier, and providing said common connection means to connect an output RF transmission cable for transmitting and receiving said RF carrier directed toward and transmitted from the subscriber unit.

2. For use in a mobile wireless communication system, a duplex RF repeater for distributing and enhancing at least one single RF carrier on which both a transmitter and a receiver of a base station are operated in the time division duplex mode, to improve the efficiency of the frequency usage in a serving area and to improve the quality of the communications between the base station and a subscriber unit, said duplex RF repeater comprising:

(a) divider means for enabling said RF carrier to be transmitted from said base station towards said subscriber unit, and to be transmitted from said subscriber unit towards said base station, including first and second divider means, said respective first divider means for coupling said RF carrier transmitted towards the base station;

(b) a first common connection means to connect said respective first divider means for transmitting said RF carrier directed towards the base station, an up-link amplification means for amplifying said RF carrier, and a second common connection means to connect said respective first divider means for receiving said RF carrier transmitted from the subscriber unit;

(c) said respective second divider means for coupling said RF carrier transmitted from the base station;

(d) said first common connection means connecting said respective second divider means for receiving said RF carrier transmitted from the base station, a down-link amplification means for amplifying said RF carrier, said second common connection means connecting said respective second divider means for transmitting said RF carrier directed towards the subscriber unit;

(e) an isolation means having control means for controlling said up-link and down-link amplification means for ensuring sufficient isolation between said up-link amplification means and down-link amplification means even on said one single RF carrier to prevent self-oscillation caused by a coupling between said first and second divider means; and (f) said first and second divider means coupling even said one single RF carrier, and providing said first and second common connection means to connect RF transmission cables for transmitting and receiving said RF carrier directed towards and transmitted from the base station.

3. For use in a mobile wireless communication system, a duplex RF repeater for distributing and enhancing at least one single RF carrier on which both a transmitter and a receiver of a base station are operated in the time division duplex mode, to improve the efficiency of the frequency usage in a serving area and to improve the quality of the communications between the base station and a subscriber unit, said duplex RF repeater comprising:

(a) divider means for enabling said RF carrier to be transmitted from said base station towards said subscriber unit, and to be transmitted from said subscriber unit towards said base station, including first and second divider means, said respective first divider means for coupling said RF carrier transmitted towards the base station from the subscriber unit;

(b) a first common connection means to connect said respective first divider means for transmitting said RF carrier directed towards the base station, an up-link amplification means for amplifying said RF carrier, and a second common connection means to connect said respective first divider means for receiving said RF carrier transmitted from the subscriber unit;

(c) said respective second divider means for coiling said RF carrier transmitted from the base station towards the subscriber unit;

(d) said first common connection means connecting said respective second divider means for receiving said RF carrier transmitted from the base station, a down-link amplification means for amplifying said RF carrier, and said second common connection means to connect said respective second divider means for transmitting said RF carrier directed towards the subscriber unit;

(e) an isolation means having control means for controlling said up-link and down-link amplification means for ensuring sufficient isolation between said up-link amplification means and down-link amplification means even on said one single RF carrier to prevent self-oscillation caused by a coupling between said first and second divider means;

(f) said first and second divider means coupling even said one single RF carrier, and providing said first and second common connection means to connect RF transmission cables for transmitting and receiving said RF carrier directed towards and transmitted from the subscriber unit; and (g) said respective first and second divider means coupling even said one single RF carrier, and providing a common connection means to connect an output RF transmission cable for transmitting and receiving said RF carrier directed towards and transmitted from the base station.

4. A duplex RF repeater as defined in claims 1, 2 or 3, wherein said isolation means include:

(a) at least one RF detector means for detecting said RF carrier;

(b) at least one control means responsive to said RF detector means to control said up-link and down-link amplification means, and for increasing and decreasing the gain of said up-link and down-link amplification means alternatively.

5. A duplex RF repeater as defined in claim 4, wherein said RF detector means is coupled onto the input of the down-link amplification means, and said control means controls the up-link amplification by increasing and decreasing the gain of said up-link amplification means alternatively.

6. A duplex RF repeater as defined in claims 1, 2 or 3, wherein said up-link and down-link amplification means includes a mixer and band pass filter to limit the frequency pass band of said amplification means.

7. A duplex RF repeater as defined in claims 1, 2, or 3, wherein said first and second divider means include at least one of a circular, an electronic switch, a multi-branch divider, a multi-branch combiner, a hybrid circuit, a directional coupler, and other equivalent circuits.

8. A duplex RF repeater according to claims 1, 2, or 3, wherein said base station includes a plurality of transmitters and receivers, a combining means for combining the RF carriers from said transmitters, and a dividing means for dividing the RF carriers to said receivers, and each pair of transmitter and receiver is operated in the time division duplex mode on a single RF carrier, and all said transmitters and receivers are synchronized in said time division duplex mode.

9. A duplex RF repeater according to claims 1, 2, or 3, wherein the duplex RF repeater is supplied AC electric power from a central power supply system on said output RF transmission cable.

10. A duplex RF repeater according to claims 1, 2, or 3, including a composition means for composing a RF carrier generated by a different system onto said RF carrier.

11. A duplex RF repeater according to claims 1, 2, or 3, including an antenna means connected to said up-link and down-link connection means instead of said RF transmission cable, and said antenna means comprises an anti-standing wave RF radiation and reception means including at least one RF connector, a metal plane, a RF coupling transmission line, and a large scale of radiation and reception element, wherein said RF coupling transmission line is connected to said RF connector, and said radiation and reception element is located on said metal plane and coupled to said RF coupling transmission line.

12. A duplex RF repeater according to claims 1, 2, or 3, including an antenna means connected to said up-link and down-link connection means instead of said RF transmission cable, and said antenna means comprises an anti-standing wave RF radiation and reception means including at least one RF connector, a metal plane, a RF coupling transmission line, and a plurality of radiation and reception elements, wherein said RF coupling transmission line is connected to said RF connector, and said radiation and reception elements are located on said metal plane and coupled to said RF coupling transmission line.

13. A duplex RF repeater according to claims 1, 2, or 3, including an antenna means connected to said up-link and down-link connection means instead of said RF transmission cable, and said antenna means comprises an anti-standing wave RF radiation and reception means including at least two separated RF connectors, a metal plane, two separated RF coupling transmission lines, and separated two groups of a plurality of radiation and reception element, wherein said two RF coupling transmission lines are connected to said two RF connectors respectively, and said two groups of radiation and reception elements are located on said metal plane and coupled to said two RF coupling transmission lines respectively.

* * * * *